United States Patent [19]

Petrak

[11] Patent Number: 5,098,112

[45] Date of Patent: Mar. 24, 1992

[54] UNITIZED DYNAMIC FACIAL SEAL

[76] Inventor: Gregory H. Petrak, 461 S. Balsam St., Lakewood, Colo. 80226

[21] Appl. No.: 590,768

[22] Filed: Oct. 1, 1990

[51] Int. Cl.$^5$ .............................................. F16J 15/00
[52] U.S. Cl. ........................................ 277/39; 277/37; 277/42; 277/47; 277/88; 384/141; 384/147; 384/484
[58] Field of Search .................... 277/37, 38, 39, 42, 277/47, 88, 30; 384/140, 141, 147, 477, 482, 484; 464/131, 133

[56] References Cited

U.S. PATENT DOCUMENTS

| | | | |
|---|---|---|---|
| 2,294,105 | 8/1942 | Wallgren | 384/140 |
| 2,482,029 | 9/1949 | Reynolds | 277/152 |
| 2,783,067 | 2/1957 | Foss | 384/140 |
| 2,868,562 | 1/1959 | Heimbuch | 277/38 |
| 3,311,430 | 3/1967 | Christensen | 384/482 |
| 3,479,840 | 11/1969 | Meyers | 464/13 |
| 3,536,332 | 10/1970 | Pitner | 464/133 |
| 3,582,091 | 6/1971 | Smith | 277/30 |
| 4,377,312 | 3/1983 | Zackrisson | 464/131 |
| 4,502,698 | 3/1985 | Collins | 271/43 |
| 4,861,172 | 8/1989 | Annast et al. | 277/30 |

FOREIGN PATENT DOCUMENTS

| | | | |
|---|---|---|---|
| 2216815 | 4/1971 | Fed. Rep. of Germany | 277/43 |
| 0230697 | 3/1925 | United Kingdom | 277/88 |

Primary Examiner—William A. Cuchlinski, Jr.
Assistant Examiner—Daniel G. DePumpo
Attorney, Agent, or Firm—John E. Reilly

[57] ABSTRACT

A dynamic seal assembly is intended for use as a facial seal between radially inner and outer relatively rotating members having a seal body mounted on a generally L-shaped annular ring, a counterface mounted on the inner of the relatively rotating members with the bearing disposed in journaled relation to the counterface, and the seal body having a sealing lip disposed at an acute angle with respect to the seal body to engage a radial flange on the bearing member and a flexible diaphragm extends radially and outwardly from the seal body to terminate in an outer circumferential sealing portion in sealed engagement with the outer of the relatively rotating members. The bearing member is so disposed with respect to the counterface as to maintain a uniform circumferential band of contact between the sealing lip and flange portion of the counterface notwithstanding axial or radial shifting between the relatively rotating members.

18 Claims, 3 Drawing Sheets

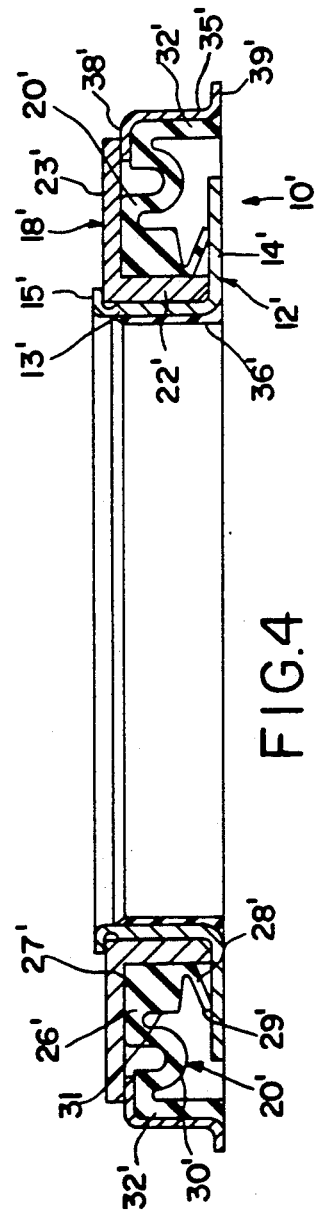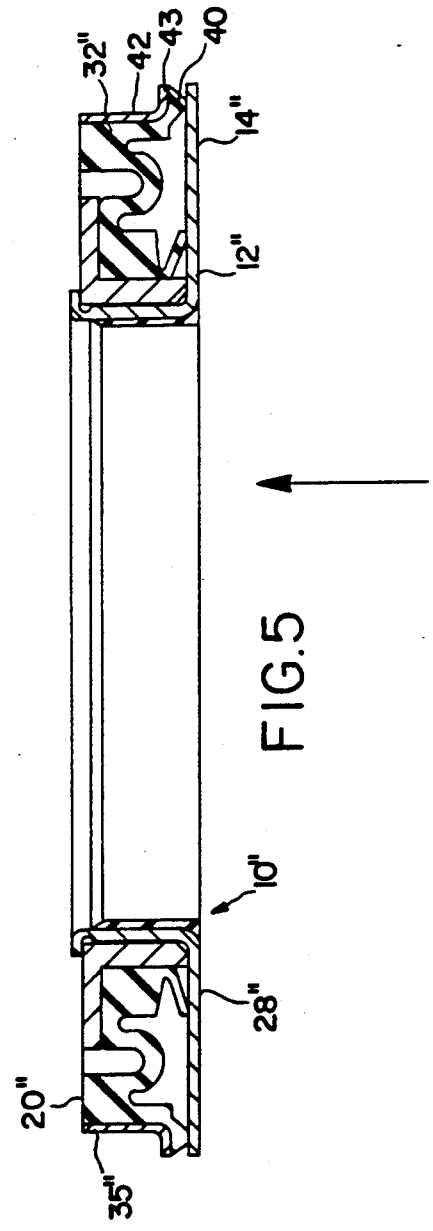

UNITIZED DYNAMIC FACIAL SEAL

This invention relates to seals; and more particularly relates to novel and improved facial seals adaptable for use in applications in which the seal must maintain sealed engagement between relatively rotating members, such as, a shaft and a bore notwithstanding eccentricity, axial displacement or angular misalignment between the members.

BACKGROUND AND FIELD OF THE INVENTION

There are numerous applications in which relatively rotating members require a facial seal to establish and maintain uniform sealed engagement with a radial flange on one of the members notwithstanding relative axial or radial movement between the members. However, if the seal is not fixed with respect to the radial flange and the flange is free to undergo any axial or radial displacement with respect to the seal, serious problems can be encountered in maintaining uniform sealing pressure against the radial surface. U.S. Pat. No. 4,502,698 to M. T. Collins, assigned to the assignee of this application, represents one approach to overcoming these problems by mounting an annular boot or diaphragm in surrounding relation to a shaft with an outer peripheral seal ring having a tapered face which engages the radial wall of a spindle housing, and a spring urges the tapered face into firm engagement with the radial wall. Furthermore, in my prior copending application for patent Ser. No. 282,683 and entitled ROTARY FACIAL SEAL AND BEARING ASSEMBLY, now U.S. Pat. No. 4,968,044 devised a facial seal in which uniform sealing pressure is maintained by the utilization of a toroidal-shaped wall section in combination with a tapered sealing lip, and the wall section is so constructed and arranged as to maintain substantially constant pressure over the entire circumference of the face portion of the seal lip notwithstanding axial misalignment or eccentric orbiting which may occur as the shaft spins. Although the forms of seal described are highly effective in most applications, there are nevertheless situations where it is important to maintain a fixed relationship between the seal body or lip and radial flange to the extent of acting as a single unit. In other words, there is no relative axial or radial motion between the seal lip and counterface or radial flange.

U.S. Pat. No. 2,482,029 to Reynolds discloses a seal which includes a sealing lip or ridge together with a rigid thrust ring, and the sealing lip extends away from a seal body which is molded to the thrust ring and is sealed against an annular surface by means of a spring element to addition, the seal includes a web portion which interconnects the seal body to an outer cylindrical portion of the seal and which also is mounted within a rigid flange. Thus, although a portion of the seal body of Reynolds is effectively mounted in fixed relation to a counterface, the sealing lip relies at least in part on spring force to maintain the necessary relationship to a cylindrical surface on which it is mounted and at a point remote from the thrust ring. Accordingly, Reynolds and the other seal devices as enumerated above do not unitize the seal lip with a counterface and in such a way as to maintain a fixed relationship notwithstanding high frequency oscillations in a radial direction and rapid reciprocating motion in an axial direction.

SUMMARY OF THE INVENTION

It is therefore an object of the present invention to provide for a novel and improved facial seal for mounting between relatively rotating members and which is capable of maintaining a fixed relationship between a seal body and a radial flange to the extent of acting as a single unit in sealing between the members.

Another object of the present invention is to provide for a novel and improved unitized dynamic seal for installation between rotating members which is capable of tolerating high frequency oscillations in a radial direction and rapid reciprocating motion in an axial direction without relative shifting of the major sealing portions of the seal.

It is a further object of the present invention to provide for a dynamic facial seal in which a sealing lip and counterface are effectively unitized so as to follow axial and radial motion as a single unit between relatively rotating members; and further wherein the seal lip is capable of running continuously along one circumferential band of contact notwithstanding relative motions occurring between the rotating members.

In accordance with the present invention, a unitized dynamic seal assembly has been devised for installation between inner and outer relatively rotating members and which seal assembly comprises an annular seal body having a sealing lip extending in a generally axial direction away from the body, a flexible wall section extending radially outwardly from the seal body and terminating in an outer circumferential sealing portion in sealing engagement with the outer relatively rotating member, an inner band having a radial flange at one end disposed in pressfit relation to the inner relatively rotating member, and bearing means is operative to position the sealing lip in sealed engagement with the radial flange whereby the sealing lip and radial flange will undergo relative rotation while remaining in fixed axial and radial relation to one another notwithstanding relative axial and angular shifting between the members.

In the preferred form of invention, the seal body is preassembled onto and fixed with respect to the bearing means, and the bearing means and seal body are retained on the inner band with the seal lip yieldingly urged against the radial flange. As a result, the seal lip will run on one circumferential band or line of contact notwithstanding relative motion occurring between the inner and outer relatively rotating members and never has to flex in response to axial displacement or misalignment between the relatively rotating members.

In a modified form of seal assembly, the bearing means has a radially outward extension mounted at the one end of the band opposite to the radial flange to limit the axial excursion of the outer sealing portion, for example, when the inner of the relatively rotating members is to be inserted for any distance from the axial end of the seal assembly opposite to the radial flange. In another modified form, the bearing means has an axial projection which extends axially beyond the flexible wall section of the seal in order to limit axial excursion in one direction.

In the forms of invention described, the inner surface of the band is covered with a rubber or rubber-like material to establish tight-fitting sealed engagement with the inner of the relatively rotating members. Moreover, the sealing lip extends at an acute angle away from one axially facing surface of the seal body and inclines in a radial outward direction for engagement with the radial flange on the inner band. Preferably, the seal body is stretched onto the bearing, the seal body being somewhat undersized with respect to the diameter of the locator bearing so as to cause the seal lip to be flexed or preloaded in an axial direction against the surface of the radial flange when assembled. In the alternative, the seal body may be molded onto the locator bearing but again is most desirably preloaded against the surface of the radial flange when assembled. Preferably, the outer sealing portion is reinforced with a rigid band or ring so as to maintain the stability of the seal with respect to the outer rotating member.

The above and other objects, advantages and features of the present invention will become more readily understood and appreciated from a consideration of the following detailed description of a preferred embodiment of the present invention when taken together with the accompanying drawings in which:

BRIEF DESCRIPTION OF THE DRAWINGS

FIG. 4 is a cross-sectional view of a modified form of seal assembly in accordance with the present invention; and FIG. 5 is cross-sectional view of another modified form of seal assembly in accordance with the present invention.

DETAILED DESCRIPTION OF THE PREFERRED EMBODIMENT

Figure 2:
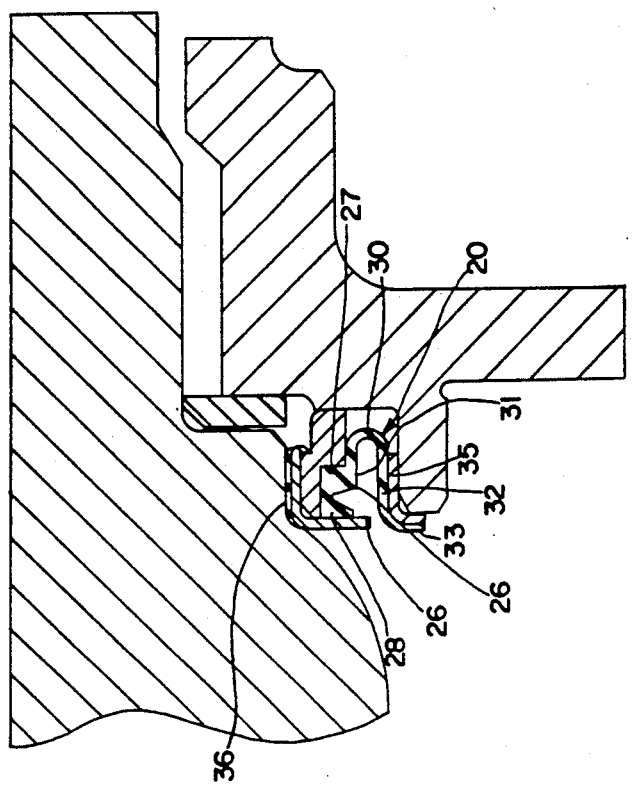
FIG. 2 is a cross-sectional view similar to FIG. 1 and illustrating the relative displacement between parts when the shaft is axially displaced with respect to the spindle housing.
Figure 1:
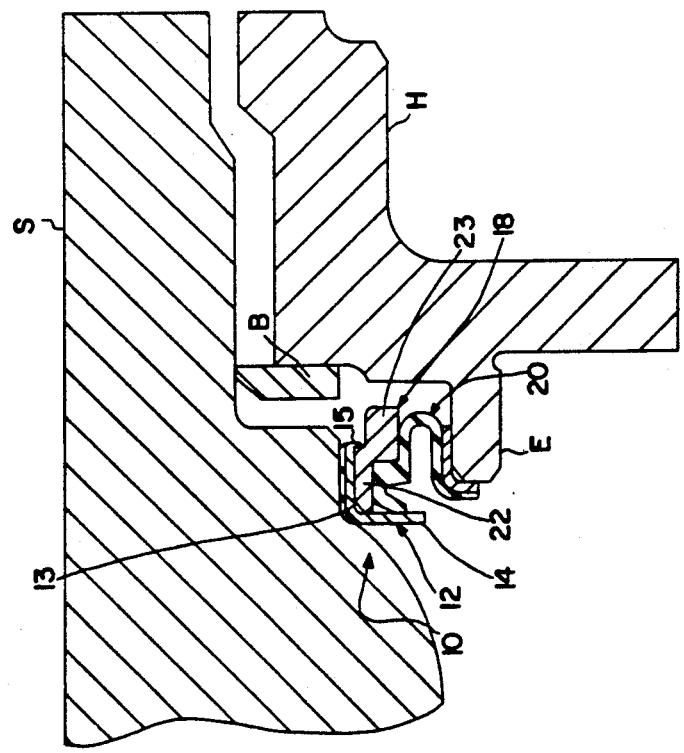
FIG. 1 is a cross-sectional view of a preferred form of seal assembly and illustrating on radial section of a seal assembly installed between a shaft and outer spindle housing in a motor vehicle.

Referring in more detail to the drawings, a preferred form of seal assembly 10 is illustrated in FIGS. 1 and 2. The assembly 10 is in the form of a grease seal which is interposed between a stationary spindle housing H and a rotating shaft S, the latter rotating with respect to the housing H. The housing H has an axial extension E disposed in outer spaced surrounding relation to the shaft S; and an annular bearing B is interposed between the shaft S and housing H to prevent direct frictional engagement between the shaft S and the housing H. In a typical automotive application, the seal 10 is subject to some eccentricity or angular misalignment as well as axial displacement between the shaft S and housing H. It is therefore important to maintain uniform sealed engagement between the seal 10 and relatively rotating inner and outer members S and H notwithstanding axial or radial displacement or shifting between the members S and H.

Figure 3:
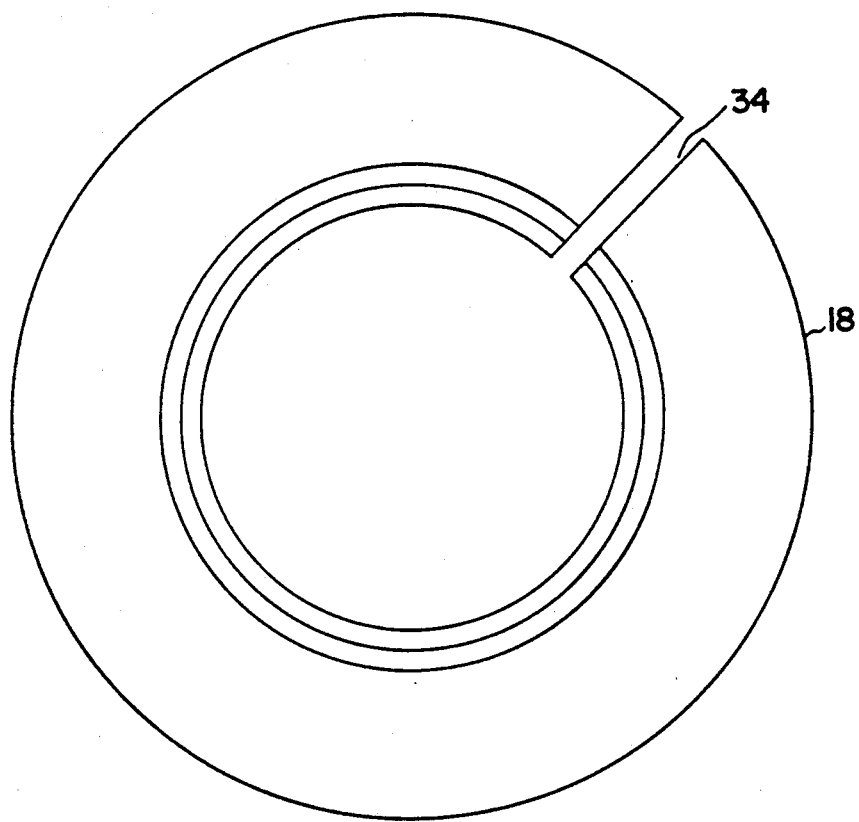
FIG. 3 is an enlarged view in elevation of a preferred form of bearing member forming a part of the preferred form of seal assembly of FIGS. 1 and 2.

In order to maintain uniform sealed engagement between the members, the seal assembly 10 is provided with a counterface 12 having an inner band 13, a radially outwardly extending flange 14 at one end of the band 13 and a radially outwardly extending lip 15 at the opposite end of the band 13 to the flange 14. An annular bearing member 18 serves as a locator for a seal member 20 to be described, the locator bearing 18 having a band 22. A radially stepped flange 23 projects axially from one end of the band 22 opposite to the radial flange 14 when in assembled relation with respect to the counterface 12. As shown in FIG. 3, the locator bearing 18 is in the form of a split ring having a radially extending gap or space 34 so as to enable outer circumferential expansion and stretching over the lip 15 into closely spaced relation to the band 13. In this relation, the locator bearing 18 is preferably dimensioned so as to fit snugly between the radial flange 14 and the lip 15 of the counterface and yet afford a limited amount of play between the bearing 18 and counterface 12 so that the counterface 12 is free to rotate freely with respect to the bearing 18.

The seal member 20 is preferably composed of an elastomeric material and includes a generally rectangular body 26 provided with one axial end or corner 27 disposed against the bearing flange 23, and the opposite axial end has a seal lip 28 inclining away from the body 26 at an acute angle and terminating in a squared end 29, one edge of which bears against the radial flange 14. The seal lip 28 is preferably of a relatively thin cross-sectional dimension with respect to the body 26 and extends outwardly and away from the body for a distance slightly greater than the thickness of the body 26.

A generally toroidal or C-shaped flexible wall section 30 inclines at a relatively low angle away from an outer circumferential surface 31 of the body 26 and merges into an outer axially extending section 32, then terminates in a radial end 33. A rigid reinforcing ring 35 encircles the section 32 and is interposed between the outer section 32 and the inner surface of the housing extension E.

Preferably, the seal member 20 is dimensioned to be slightly undersized with respect to the diameter of the bearing member 18 so as to require circumferential expansion or stretching to fit over the bearing member 18. The seal member 20 is assembled by stretching or molding onto the bearing member 18 prior to installation of the bearing member 18 over the counterface as described so that the bearing member 18 must be expanded slightly against the inward urging of the seal member in passing over the radial lip 15 onto the counterface. The ring 35 is united with the outer section 32 of the seal member 20, such as, by molding the outer section 32 around the ring member 35. In this way, the ring member 35 will reinforce the seal by moving into pressfit engagement with the housing extension E. In assembled relation, the locator bearing 18 will fix the position of the seal body 26 and the seal lip 28 in axial and radial directions relative to the counterface 12, and the seal lip 28 is preloaded axially against the flange 14 as a result of the hoop stress which is generated when the seal body is stretched over the locator bearing 18. In the alternative, when the seal body is molded onto the bearing 18, the seal lip 28 is axially compressed in the process of assembly onto the counterface 12 so as to be effectively preloaded against the counterface 12.

The bearing member 18 preferably is an annular ring composed of a rigid plastic low-coefficient-of-friction material with a radially split portion 34 as described. In turn, the counterface 12 is a stamped metal ring with the radial flange 14 being formed to extend in an outward radial direction away from one end of the band 13. The inner surface of the band 13 is covered by a thin section 36 of elastomeric material which bears against the shaft S when installed.

By virtue of the relationship established between the counterface 12, bearing member 18 and seal member 20, when the shaft is under rotation the only significant relative motion that occurs between the seal lip 28 and counterface 12 is rotational motion. The lip load, contact angle and circumferential path of movement of the seal lip 28 never varies relative to the radial flange 14. Further, any shaft eccentricity with respect to the spindle as well as axial displacement or angular misalignment occurring between the shaft and spindle is compensated for by the rolling and flexing nature of the diaphragm-like wall section 30. In other words, the seal lip 28 is not required to flex in response to axial displacement or misalignment and the lip contact angle will remain constant relative to the radial flange 14 of the counterface 12. In the event of any extreme axial movement between the shaft S and housing H, the flange 23 of the bearing 18 projects axially beyond the wall section 30 to engage the housing H and prevent direct engagement of the wall section 30 with the housing.

DETAILED DESCRIPTION OF MODIFIED FORMS OF INVENTION

A modified form of seal assembly 10' is illustrated in FIG. 4 wherein like elements to those of FIGS. 1 and 2 are correspondingly enumerated with prime numerals. In this form, the seal assembly 10' is designed for installation of a shaft from the inside as designated by the direction of the arrow in FIG. 4. To this end, the seal assembly 10' includes a counterface 12' having an inner band 13', a radial flange 14' at one axial end of the band 13' and a lip 15' at the opposite axial end of the band 13'. A bearing member 18' has a band 22' and a radial flange 23' at one end opposite to the radial flange 14' of the counterface 12'. Again, the bearing 18' is in the form of a ring having a radially split portion, not shown, so that it can be expanded over the lip 15 into closely surrounding relation to the band 13' but fits snugly between the flange 14' and lip 15' with sufficient play between the bearing 18' and counterface 12' for free rotation of the counterface 12'.

A seal member 20' includes a body portion 26' with its inner corner 27' disposed against the flange 23' and a seal lip 28' extends at an acute angle away from the opposite axial end of the seal with a squared end 29' which bears against the flange 14'. Again, the seal lip 28' is relatively thin with respect to the body 26'. A rolling diaphragm in the form of a generally C-shaped flexible wall section 30' extends in a radially outward direction from the seal body 26' and terminates in an outer axially extending section 32' which is encircled by a rigid reinforcing ring 35'. The ring 35' has a radially inwardly directed lip 38' which extends between one end of the section 32' and the radial flange 23' of the bearing 18'. A radially outwardly directed lip 39' of the ring 35' is disposed in radially outwardly spaced and aligned relation to the flange 14' to facilitate attachment to an outer of the relatively moving members, such as, the housing H in the form of FIGS. 1 and 2. The elements are assembled in the manner hereinbefore described in connection with FIGS. 1 and 2. However, the bearing member 18' preferably is an L-shaped annular ring member in which the radial flange 23' extends radially and outwardly along the one axial end of the seal member 20' so as to abut the lip 38' of the ring 35' thereby limiting axial displacement of the outer wall section 30' when a shaft is inserted through the seal assembly in the direction of the arrow. Typically, the outer ring 35' would first be assembled into press-fit relation to the outer stationary housing, such as, the housing H, and any axial pressure exerted by the shaft as it is inserted into position within the seal assembly would be borne by the radial flange 23'. Again, it should be noted that the inner surface of the band 13' is embedded in a thin section 36' of elastomeric material and it is therefore important that the flange resist axial travel of the seal when the shaft is inserted from the inside.

A variation of the modified form of seal assembly 10' is illustrated in FIG. 5 in which like elements are correspondingly enumerated to those of FIG. 4. In FIG. 5, the seal assembly 10'' is designed for installation of a shaft from the opposite direction to that shown in FIG. 4, as designated by the arrow, after the seal assembly is mounted within the outer of the relatively rotating members, such as, a housing H, not shown. Accordingly, the counterface 12'' corresponds to the construction of the counterface 12' but has a radial flange 14'' extending radially beyond the outer peripheral edge of the outer section 32'' of the seal member 20''. The outer circumferential section 32'' is modified by having a radially outwardly extending section 40 which bears against the radial flange 14'' when the seal is in its relaxed position. Outer encircling ring 35'' includes an axially extending band 42 which terminates in a radially outwardly extending lip 43 directly behind the portion 40 of the seal member 20''.

Accordingly, when the shaft is installed by insertion through the seal assembly 10'', the radial flange 14'' will act as a limit stop preventing axial displacement of the seal member 20'' beyond the aligned position shown in FIG. 5. Once assembled, however, the seal assembly is free to follow any axial or radial excursions or movement between the shaft and outer housing, and the seal lip 28'' would remain in fixed relation to the radial flange 14'' as previously described with reference to FIGS. 1 and 2.

It is therefore to be understood that while preferred and alternate forms of invention have been herein set forth and described, various modifications and changes may be made without departing from the spirit and scope of the present invention, as defined by the appended claims and reasonable equivalents thereof.

I claim:
1. A dynamic seal for installation between radially inner and outer relatively rotating members comprising:
    an annular seal body having a sealing lip inclining away from one side of said body, a flexible wall section extending radially from said seal body and including a circumferential sealing portion in sealed engagement with one of said relatively rotating members, said seal body disposed in sealed engagement with the other of said relatively rotating members;
    a substantially rigid band in a pressfit engagement to the other of said relatively rotating members, said band including a radial flange portion; and
    a bearing member interposed between said seal body and said band, said bearing member including means positioning said sealing lip in sealed engagement with said radial flange portion whereby said sealing lip and radial flange portion are maintained against axial movement in relation to one another notwithstanding relative axial or angular shifting between said inner and outer relatively rotating members.

2. Seal apparatus according to claim 1, said bearing member including an axially extending flange abutting said radial flange portion.

3. Seal apparatus according to claim 1, said sealing lip positioning means including means movable into engagement with said one of said relatively rotating members to limit axial excursion of said seal body in one direction.

4. Seal apparatus according to claim 3, said bearing member including an annular ring composed of a rigid, low coefficient of friction material.

5. Seal apparatus according to claim 4, said band including a radially outwardly directed lip at one axial edge opposite to that of said radial flange, said annular ring being split so as to be free to undergo expansion in order to clear said rigid lip when assembled onto said band, said annular ring mounted on said band between said lip and said radial flange.

6. Seal apparatus according to claim 1, said seal body being of a slightly lesser diameter with respect to said bearing means and stretched over said bearing means to cause said seal lip to be preloaded in an axial direction into sealed engagement with said radial flange.

7. Seal apparatus according to claim 1, said wall section being of a relatively narrow cross-section with respect to the thickness of said seal body.

8. Seal apparatus according to claim 1, said outer circumferential sealing portion including a rigid ring disposed internally of said outer circumferential sealing portion.

9. A seal apparatus adapted for installation between inner and outer relatively rotating members comprising:
   an annular seal body having a sealing lip extending in a generally axial direction away from said body, a flexible diaphragm extending radially outwardly from said seal body and including in an outer ring-like sealing portion in sealed engagement with said outer of said relatively rotating members:
   an inner, substantially rigid band in pressfit engagement to said inner of said relatively rotating members, said band including a radial flange portion; and
   bearing means interposed between said seal body and said band for urging said sealing lip into sealed engagement with said radial flange portion whereby said sealing lip and radial flange portion will undergo relative rotation while remaining in fixed axial and radial relation to one another notwithstanding relative axial or radial shifting between said inner and outer relatively rotating members.

10. A seal according to claim 9, said bearing means including a radially extending flange, and said seal body abutting said radially extending flange of said bearing means, said radially extending flange movable into engagement with said outer of said relatively rotating members to limit the axial excursion of said seal in one direction.

11. A seal according to claim 10, said bearing means being in the form of a generally L-shaped annular ring composed of a rigid, low coefficient of friction plastic material and said inner, substantially rigid band composed of a metallic material, and said annular ring disposed in loose-fitting relation to said band between said rigid lip and said radial flange portion.

12. A seal according to claim 11, said band including a radially outwardly directed lip at one axial edge opposite to that of said radial flange, said annular ring being split for assembly over said rigid lip and onto said band, and said annular ring mounted on said band between said rigid lip and said radial flange.

13. A seal according to claim 9, said diaphragm being of toroidal configuration and having a relatively narrow cross-section with respect to that of said seal body, said outer ring-like sealing portion including a reinforcing ring member, and said bearing means including a radially extending flange engageable with said outer sealing portion to limit the axial excursion of said seal in one direction.

14. A seal according to claim 9, including limit stop means to limit axial excursion of said seal in one direction.

15. A seal according to claim 14, said limit stop means defined by a radially outwardly stepped shoulder portion on said bearing means extending in an axial direction opposite to said radial flange portion.

16. A dynamic seal assembly interposed between an outer annular member and an inner rotating shaft, said seal assembly comprising:
   an annular seal body having a sealing lip extending at an acute angle with respect to said seal body, a flexible diaphragm extending radially and outwardly from said seal body and including in an outer sealing ring in sealed engagement with said annular member;
   an inner substantially rigid counterface disposed in pressfit engagement to said shaft, said counterface having a radial flange at one end and a radial lip at an opposite end; and
   bearing means in the form of an annular ring interposed between said seal body and said counterface, a radially extending portion of said ring disposed on one side of said seal body opposite to said sealing lip, said bearing means urging said sealing lip into sealed engagement with said radial flange whereby said sealing lip will maintain a uniform circumferential line of contact with said radial flange as said radial flange is rotated with respect to said sealing lip.

17. A dynamic seal assembly according to claim 16, said radially extending portion terminating at its outer periphery along one axial end of said outer sealing ring.

18. A dynamic seal assembly according to claim 16, said radially extending portion of said ring having an axial projection extending in an axial direction beyond said seal body.

* * * * *

UNITED STATES PATENT AND TRADEMARK OFFICE
CERTIFICATE OF CORRECTION

PATENT NO. : 5,098,112
DATED : 24 March, 1992
INVENTOR(S) : Gregory H. Petrak

It is certified that error appears in the above-identified patent and that said Letters Patent is hereby corrected as shown below:

| Column No. | Line | |
|---|---|---|
| 1 | 34 | after "4,968,044", insert -- I -- |
| 1 | 55 | after "to", insert -- prevent the sealing lip from flexing outwardly. In -- |
| 7 | 33 | (Claim 9) cancel "in" |

Signed and Sealed this

First Day of June, 1993

Attest:

MICHAEL K. KIRK

*Attesting Officer*  *Acting Commissioner of Patents and Trademarks*